United States Patent

Sigafoose

[15] 3,699,706
[45] Oct. 24, 1972

[54] MODEL AIRPLANE AND METHOD OF ASSEMBLING SAME

[72] Inventor: Glen Sigafoose, 401 South Front, Montezuma, Iowa

[22] Filed: Dec. 4, 1970

[21] Appl. No.: 95,059

[52] U.S. Cl. ..................................................46/78
[51] Int. Cl. ...........................................A63h 27/00
[58] Field of Search................................46/78, 76 R

[56] References Cited

UNITED STATES PATENTS

| | | | |
|---|---|---|---|
| 2,870,569 | 1/1959 | Bergstrand | 46/76 R |
| 2,292,416 | 8/1942 | Walker | 46/78 |

*Primary Examiner*—Louis G. Mancene
*Assistant Examiner*—J. Q. Lever
*Attorney*—Zarley, McKee & Thomte

[57] ABSTRACT

A model airplane including a profile fuselage of flat balsa wood and including a balsa wood tail assembly and wing. Convex outwardly fuselage half sections of sheet-like plastic material are secured to the profile fuselage by cement being placed along the top and bottom longitudinal edges of the profile fuselage for securing the longitudinal edges of the fuselage half sections. The profile fuselage includes a cutout adjacent the wing in which a bellcrank is positioned connected to a pushrod extending rearwardly along the profile fuselage and through an opening formed in the profile fuselage. The rear end of the pushrod extends through an opening in the fuselage half section and is connected to the elevator. Leadout control lines extend from the bellcrank along the wing through the fuselage half section. In assembling the fuselage half sections to the profile fuselage a series of pins are placed along the top and bottom longitudinal edges of the profile fuselage and a first fuselage half section is secured to the profile fuselage in engagement with the pins. Upon a bond being formed the pins are removed and the other fuselage half section is cemented in place.

7 Claims, 8 Drawing Figures

PATENTED OCT 24 1972          3,699,706
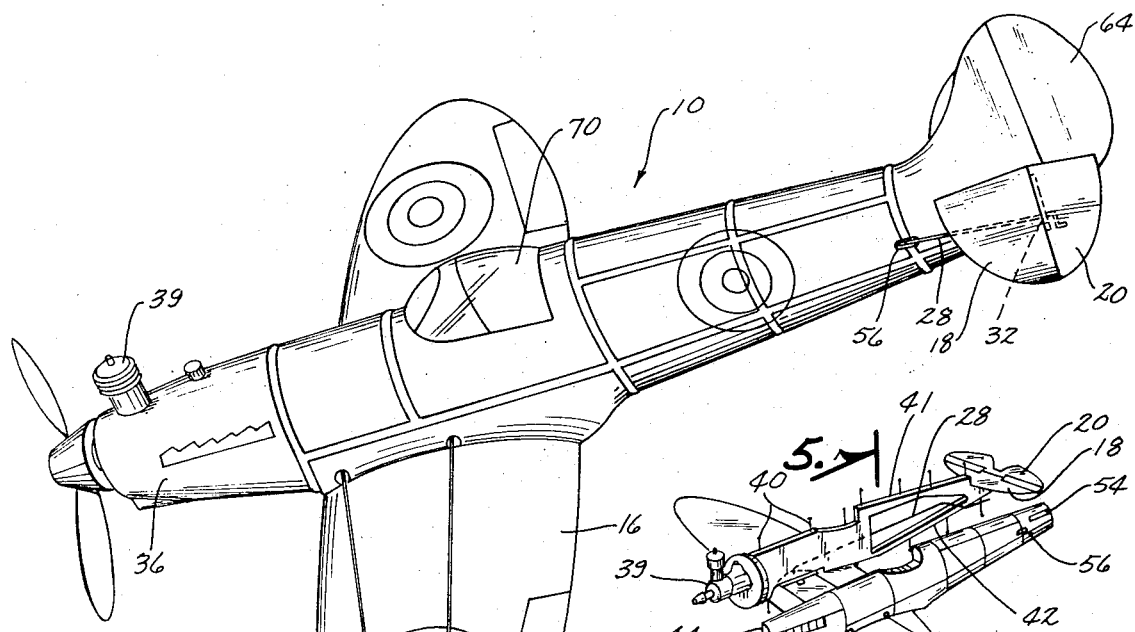
INVENTOR
GLEN SIGAFOOSE
BY
Zarley, McKee & Thomte
ATTORNEYS

MODEL AIRPLANE AND METHOD OF ASSEMBLING SAME

The construction of model airplanes is a very popular pastime with children and adults. The use of gasoline engines has made this hobby even more popular. The construction of all balsa wood airplanes is quite time consuming since many balsa wood pieces must be utilized and cemented together to form the fuselage, wing and tail section. An all plastic plane is undesirable as it does not have the structural strength per unit weight that characterizes balsa wood constructed planes.

The model airplane of this invention utilizes the advantages of both balsa wood and preformed plastic components to provide an airplane which is light in weight but has sufficient strength for normal flying. The airframe including the fuselage, wing and tail section, is formed from balsa wood pieces cemented together and preformed thin walled plastic fuselage half sections are provided on opposite sides of the balsa wood profile fuselage.

The assembly of the fuselage half sections to the balsa wood profile fuselage is greatly simplified by providing a series of pins along the top and bottom edges of the profile fuselage against which one of the fuselage half sections is positioned and secured at its edges to the profile fuselage along half the thickness of its longitudinal edges. Then the pins are removed and the other fuselage half section is placed up against the opposing edges of the first fuselage half section thereby extending over the remaining half thickness of the profile fuselage longitudinal edges.

A bellcrank is rotatably secured to the wing under the profile fuselage and a pushrod extends rearwardly along the profile fuselage and through an opening to the opposite side thereof and then further rearwardly for pivotal connection with the pivotal elevator of the tail section. Leadout controls extending from the bellcrank along the wing permit operation of the plane from the ground.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a perspective view of the model airplane of this invention;

FIG. 2 is a perspective view illustrating the balsa wood frame;

FIG. 3 is a perspective view of the pair of plastic fuselage half sections;

FIG. 4 is a perspective view illustrating the left fuselage half section being secured to the profile fuselage against the series of pins in the top and bottom longitudinal edges;

FIG. 5 is a cross sectional view taken along line 5 — 5 of FIG. 4;

FIG. 6 is a view similar to FIG. 4 but showing the two fuselage half sections in place and temporarily secured together by masking tape while the cement is forming a bond;

FIG. 7 is a cross sectional view taken along line 7 — 7 in FIG. 6; and

FIG. 8 is a perspective view of the completed model airplane of this invention prior to the exterior design having been applied thereto to produce the airplane of FIG. 1.

The model airplane of this invention is referred to in FIG. 1 generally by the reference numeral 10.

In FIG. 2 a basic airplane 12 includes a profile fuselage 14 of sheet balsa wood and is secured by cement along its bottom longitudinal forward edge to a wing 16. A stabilizer 18 is cemented to the rear of the profile fuselage 14 and includes an elevator 20 hinged to the stabilizer by fabric hinges 22.

A bellcrank 24 is pivotally connected to the wing 16 in a cutout space in the profile fuselage 14. The opposite ends of the bellcrank are connected to leadout wires 26 extending through guides 28 at the outer end of the wing. A pushrod 28 is connected to the bellcrank on the opposite side of its pivotal axis from the leadouts 26 and extends rearwardly along the profile fuselage 14 and through an enlarged opening 30 and then rearwardly to a connection with an elevator horn 32.

A firewall 34 is secured to the forward edge of the profile fuselage 14 and is strengthened by triangular vertical pieces 35 on opposite sides of the profile fuselage. A gas engine 39 is appropriately secured to the firewall 34.

The airframe 12 and particularly the profile fuselage 14, is given model fuselage shape by a pair of fuselage half sections 36 and 38 being placed on opposite sides thereof and secured by cement or the like. First, a series of pins 40 are inserted in the top and bottom edges 41 and 42, respectively of the profile fuselage. Then the left profile fuselage section 36 is placed up against these pins and its longitudinal edges 44 will overlie half the thickness of the top and bottom profile fuselage edges 41 and 42. As seen in FIG. 5, masking tape 46 is used to secure the left fuselage half section 36 in place until the cement has dried. Then the pins 40 are removed from the top and bottom longitudinal edges 41 and 42 permitting the right fuselage half section 38 to be placed in position as seen in FIG. 7, with its longitudinal edges overlying the other half of the top and bottom longitudinal profile fuselage edges 41 and 42. Masking tape 50 may be used to hold the right fuselage half section 38 in place until it is bonded to the profile fuselage 14 and to the opposite fuselage half section 36.

The fuselage half sections 36 and 38 are formed of thin plastic material and form with the profile fuselage 14 air spaces 52 on opposite sides thereof. A pair of rearwardly extending slots 54 are provided in the fuselage half sections to receive the stabilizer 18. The rear end of the push-rod 28 extends out through an opening 56 in the left-hand fuselage half section 36. The forward ends of the fuselage half sections 36 and 38 matingly embrace and engage the firewall 34 and thus help to rigidify the airplane structure. Further rigidity is provided by the bottom portions 60 of the fuselage half sections 36 and 38 matingly engaging and being secured to the top surface of the wing 16.

The cementing of the rudder 64 to the stabilizer 18 and the profile fuselage 14 completes the tail section. A canopy 70 is glued in place on the fuselage half sections as seen in FIG. 8.

The exterior of the plane is then appropriately decorated to provide the desired appearance and as seen in FIG. 1, a Supermarine Spitfire is illustrated. A 0.049 Cox Golden Bee engine 39 has been utilized.

Landing wheels 80 are provided on a basically U-shaped landing gear 82 which is imbedded in the bottom side of the balsa wood wing 16.

It is seen that in FIG. 2 the balsa wood airframe has been assembled and in FIGS. 4 – 8 the fuselage is completed in its appearance by the attachment to the profile fuselage of the fuselage half sections. The preciseness of attachment of the fuselage half sections 36 and 38 to the profile fuselage 14 is accomplished by the use of the series of pins 40 which permits fast and accurate positioning of the fuselage left half section 36 to the longitudinal edges 41 and 42 on the profile fuselage 14, as seen in FIG. 5. Then the removal of the pins 40 permits placement of the fuselage half section 38 longitudinal top and bottom edges against the opposing edges of the fuselage half section 36 and over the remaining half of the top and bottom longitudinal edges 41 and 42 of the profile fuselage 14 to complete the fuselage assembly, as seen in FIG. 7. Thus it is seen the model plane of this invention may be quickly constructed and enjoy the light weight characteristics of balsa wood and provide the finished appearance made possible by the preformed plastic fuselage half sections 36 and 38.

I claim:

1. A model airplane comprising,
   a profile fuselage of flat sheet balsa wood material having longitudinal top and bottom edges,
   a wing secured to said fuselage,
   a tail section secured to said profile fuselage and including a rudder, stabilizer and elevator, and
   plastic C-shaped fuselage half sections of substantially sheet material secured to opposite sides of said profile fuselage, said C-shaped sections including substantially flat legs merging into flat longitudinal edges meeting along and extending over the longitudinal top and bottom edges of said profile fuselage and providing a smooth continuous fuselage exterior.

2. The structure of claim 1 wherein said profile fuselage and said plastic fuselage half sections provide air chambers extending the substantial length of said profile fuselage and fuselage half sections.

3. The structure of claim 1 wherein said wing is formed from sheet balsa wood and is secured to the lower longitudinal edge of said profile fuselage.

4. The structure of claim 3 wherein said fuselage half sections include rearwardly extending aligned slots in which said stabilizer is positioned.

5. The structure of claim 4 wherein said fuselage half sections include bottom longitudinal edge portions secured to said wing.

6. The structure of claim 1 wherein said profile fuselage includes a cutout along its lower longitudinal edge whereby a bellcrank is rotatably secured to said wing in said cutout, a pushrod is connected at one end to said bellcrank and extends rearwardly along said profile fuselage and through an opening formed in said profile fuselage to the opposite side thereof and out through an opening in the adjacent fuselage half section and the rear end of said pushrod is pivotally connected to said elevator.

7. The structure of claim 1 wherein a firewall is transversely secured to the forward end of said profile fuselage with said fuselage half sections substantially matingly embracing said firewall, and an engine is secured to said firewall to extend forwardly therefrom.

* * * * *